(No Model.)

5 Sheets—Sheet 1.

G. F. MOORE.
MACHINE FOR CUTTING HEEL STIFFENERS.

No. 513,242.

Patented Jan. 23, 1894.

Witnesses:
Walter E. Lombard
Marshall Underwood

Inventor:
George F. Moore,
by N. C. Lombard
Attorney.

(No Model.)
G. F. MOORE.
MACHINE FOR CUTTING HEEL STIFFENERS.

No. 513,242. Patented Jan. 23, 1894.

Witnesses:
Walter E. Lombard.
Marshall Underwood

Inventor:
George F. Moore,
by N. C. Lombard
Attorney.

(No Model.)  5 Sheets—Sheet 3.

G. F. MOORE.
MACHINE FOR CUTTING HEEL STIFFENERS.

No. 513,242.  Patented Jan. 23, 1894.

Witnesses:
Walter E. Lombard
Marshall Underwood

Inventor:
George F. Moore,
by N. C. Lombard
Attorney.

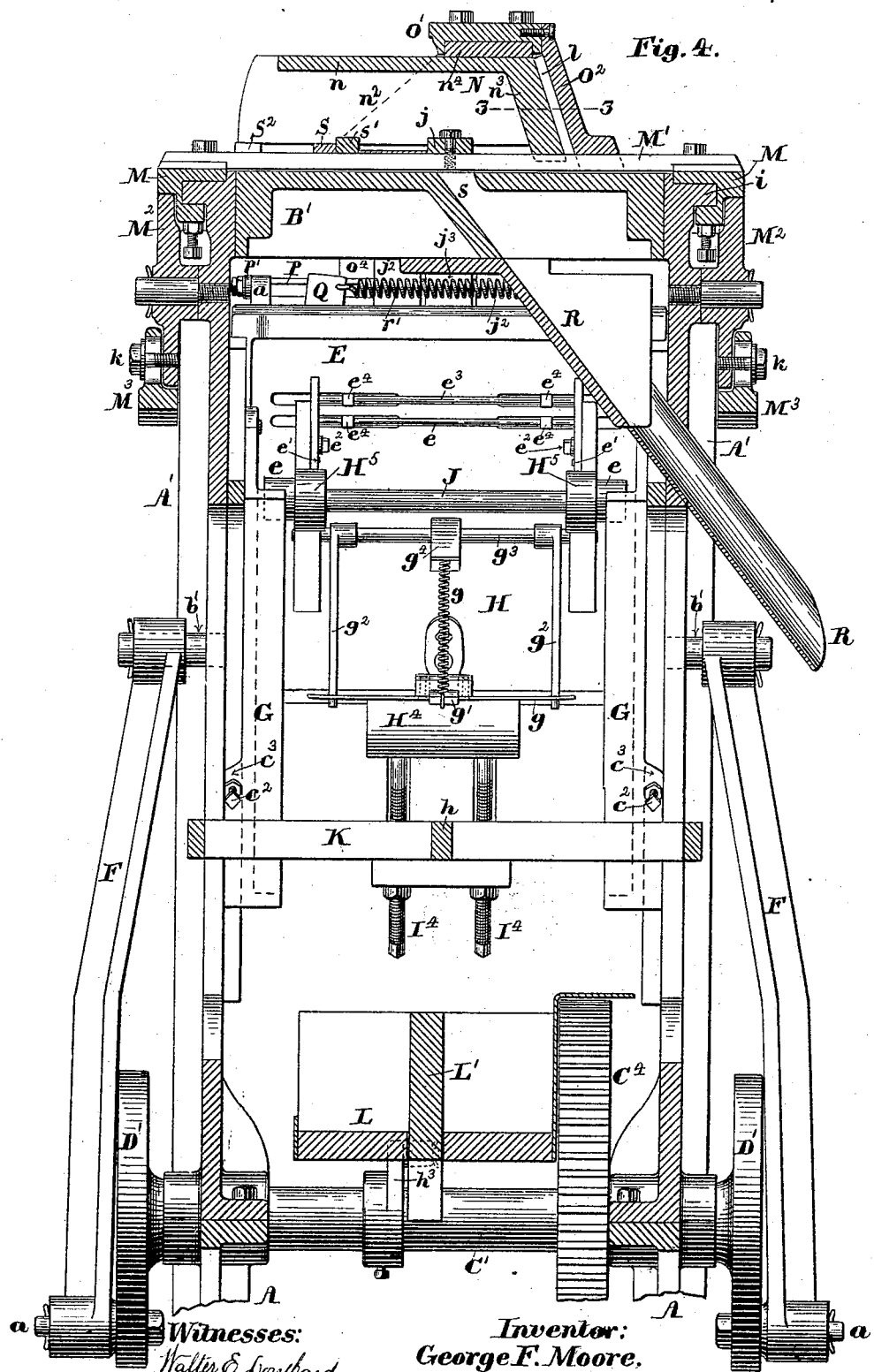

(No Model.) 5 Sheets—Sheet 5.
G. F. MOORE.
MACHINE FOR CUTTING HEEL STIFFENERS.
No. 513,242. Patented Jan. 23, 1894.
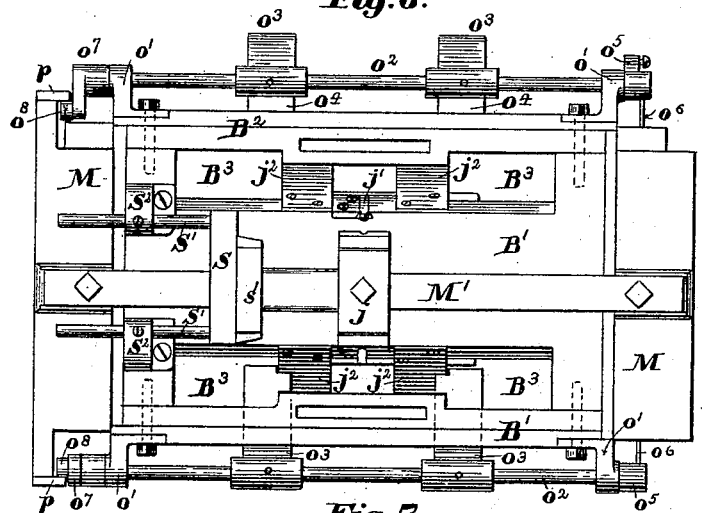
Fig. 6.
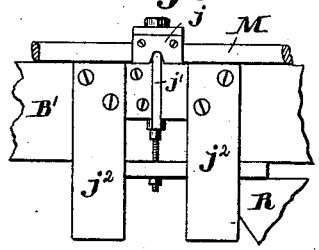
Fig. 7.
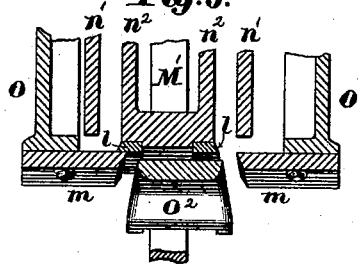
Fig. 5.
Fig. 9.
Fig. 8.
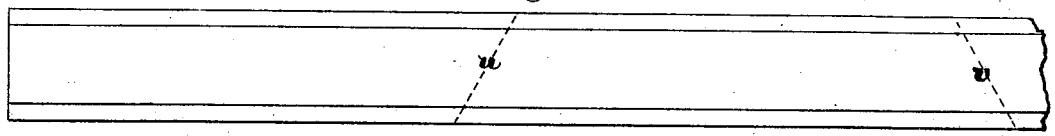
Fig. 10.
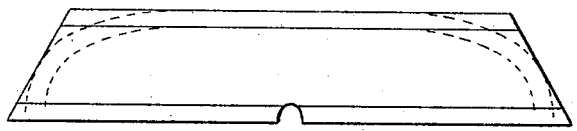
Witnesses:
Walter E. Lombard.
Marshall Underwood.
Inventor:
George F. Moore,
by N. C. Lombard
Attorney.

UNITED STATES PATENT OFFICE.

GEORGE F. MOORE, OF KENNEBUNK, MAINE.

MACHINE FOR CUTTING HEEL-STIFFENERS.

SPECIFICATION forming part of Letters Patent No. 513,242, dated January 23, 1894.

Application filed May 9, 1893. Serial No. 473,543. (No model.)

*To all whom it may concern:*

Be it known that I, GEORGE F. MOORE, of Kennebunk, in the county of York and State of Maine, have invented certain new and useful Improvements in Machines for Cutting Heel-Stiffeners, of which the following, taken in connection with the accompanying drawings, is a specification.

My invention relates to machines for cutting heel stiffeners, is an improvement upon the invention shown and described in the Letters Patent No. 304,844, granted to me September 9, 1884, and it consists in certain novel features of construction, arrangement and combination of parts which will be readily understood by reference to the description of the drawings, and to the claims at the end of this specification in which my invention is clearly pointed out.

Figure 1:
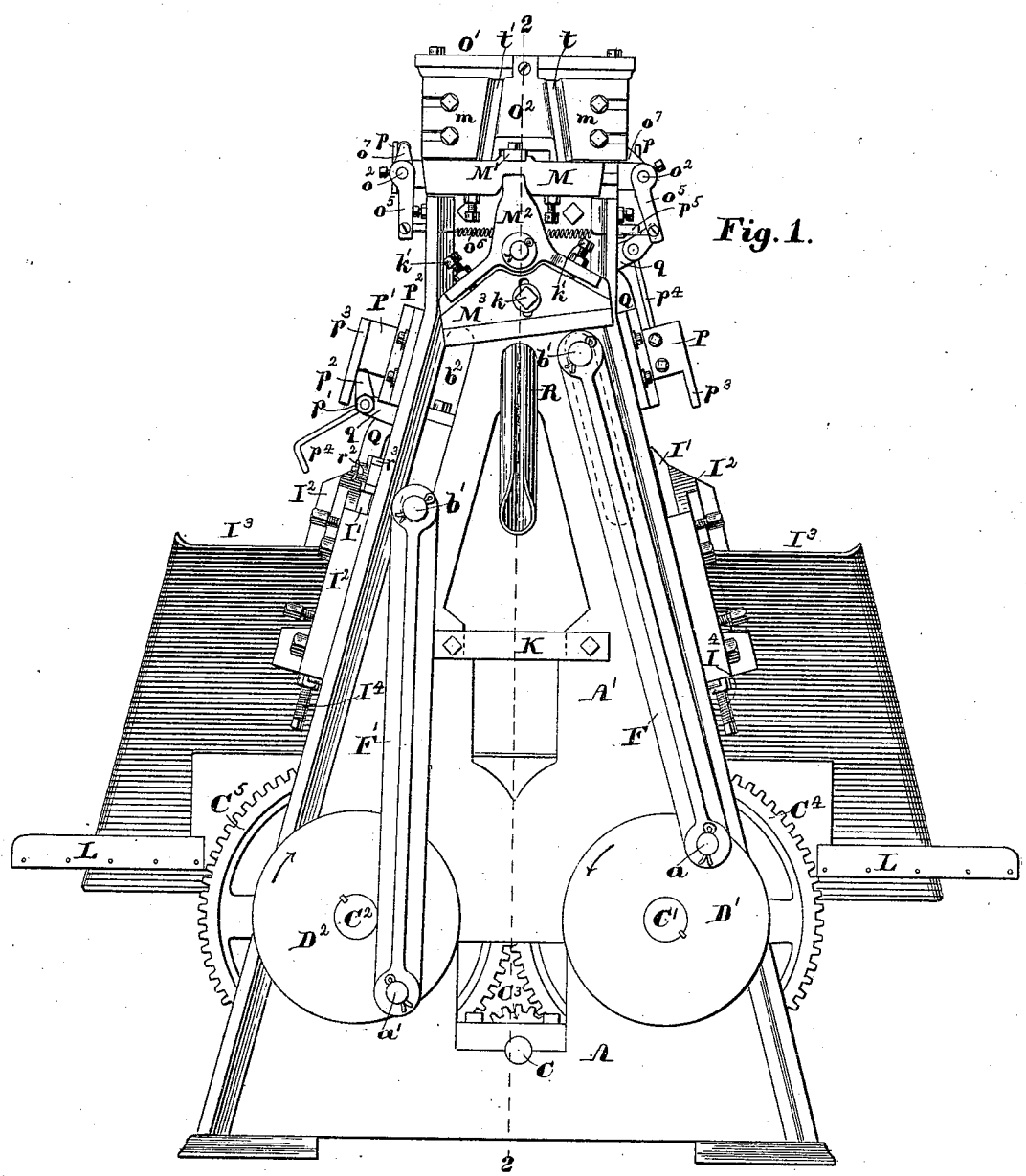
Figure 2:
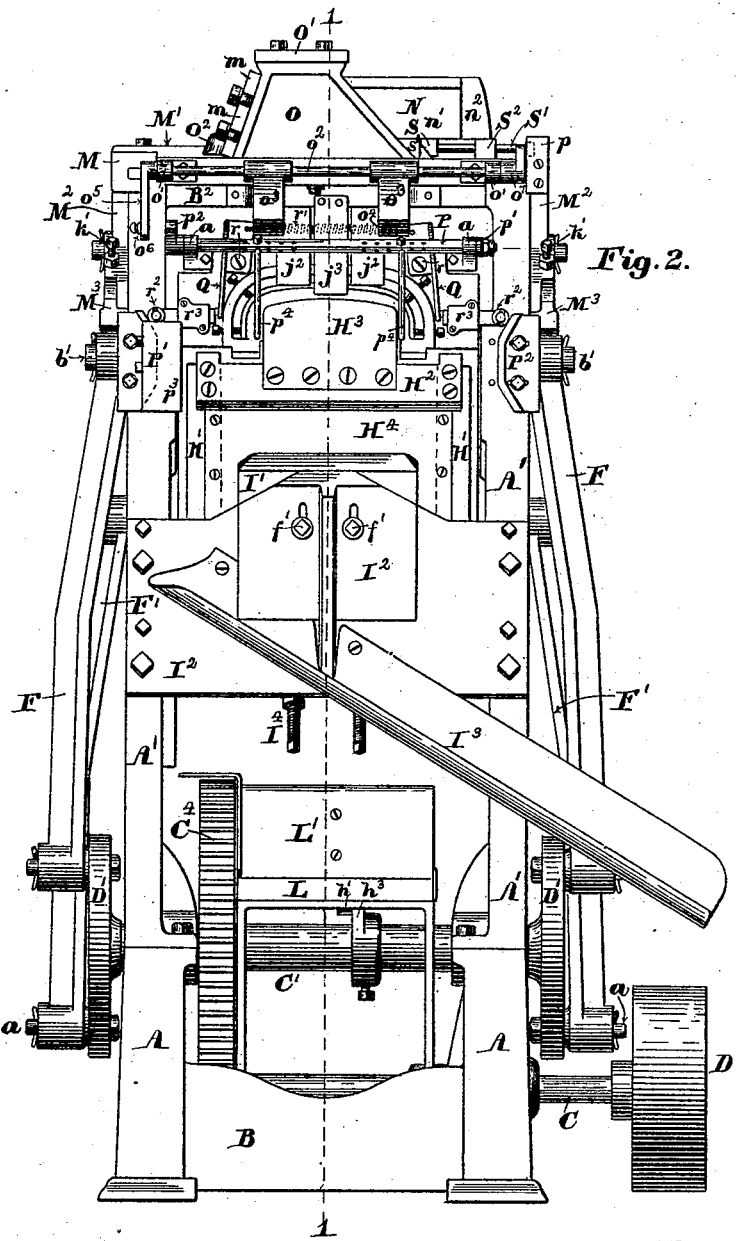
Figure 3:
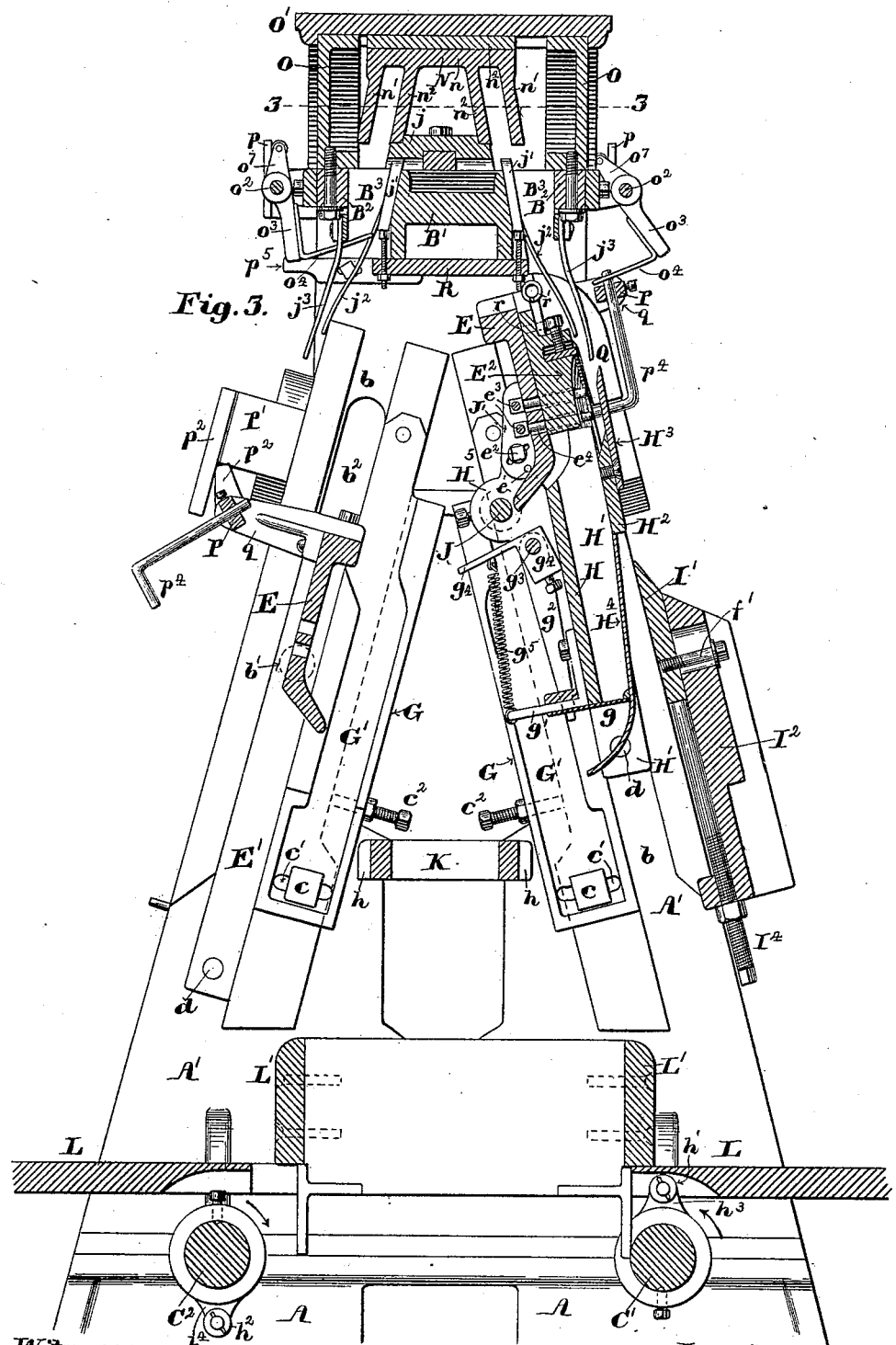

Figure 1 of the accompanying drawings is a front elevation of a machine embodying my invention. Fig. 2 is an elevation of the right hand side of the same, the left hand side being a counterpart of said right side. Fig. 3 is a vertical sectional elevation the cutting plane being on line 1, 1, on Fig. 2 with certain of the parts removed from the left side of said figure in order to show parts beyond. Fig. 4 is a sectional elevation the cutting plane being on line 2, 2, on Fig. 1. Fig. 5 is a partial horizontal section on line 3, 3, on Figs. 3 and 4. Fig. 6 is a plan of the upper portion of the main section or body of the machine with the head or cutting off section removed. Fig. 7 is an elevation of the notch cutting knives and the guiding fingers on one side of the machine. Fig. 8 is an elevation of a portion of a strip of leather board from which the blanks are to be cut. Fig. 9 is a transverse section of said strip, and Fig. 10 is an elevation of a section of said strip of the proper length to be delivered to the mold, and illustrates by dotted lines the form of the blank after being pressed into said mold and subjected to the action of the trimming knife.

This machine is designed for cutting heel stiffener blanks from strips of leather-board, which are skived or beveled along their two longest and parallel edges both of said skivings being upon the same side of the material as shown in Figs. 8 and 9.

In order to reduce to the minimum the waste of material, in cutting heel stiffener blanks it is necessary that said strips of material should be separated into sections of the desired length by a series of cuts oblique to the edges of the strip alternately in opposite directions as shown in Fig. 10. This was done in the machine described in my prior patent before cited, but as all of said oblique cuts were made by the same knife moving vertically while the material rested upon a horizontal bed it was necessary to turn the strip up side down after each cut, and as the severed sections were all moved in the same direction into the molds and presented to the action of the skiving knife without being turned over after being severed from the strip, it follows, that, in order to have the heel stiffeners all alike, when finished, the strips of leatherboard had to have their two edges chamfered upon opposite sides, and then the blank would when finished have its straight edge chamfered or skived on one side and its curved edge upon the opposite side, or waste considerable material.

It is very desirable that the skiving should all be upon the same side and to accomplish this desirable result and at the same time increase the capacity of the machine is the object of my present invention.

In the drawings A, A, are the base sections of the side frames connected together by the tie girts B, B, and having mounted in suitable bearings thereon the driving shaft C and the crank shafts C' and C², and having bolted thereto the upper sections A', A', of said side frames which are connected together at their upper ends by the tie girt B' as shown in Figs. 3 and 4. The shaft C has secured thereon the pinion C³ which engages with and imparts motion to the spur gear wheel C⁴, firmly secured upon the crank shaft C', which gear C⁴ engages with and imparts motion to the gear C⁵ firmly secured upon the shaft C². The shaft C also has mounted thereon a suitable driving pulley as D, the shaft C' has firmly secured upon each end thereof outside of its bearings a crank disk D' having set therein the crank-pin $a$, and the shaft C² has firmly secured on each end thereof a similar crank disk D² having set therein the crank-pin $a'$ as shown in Figs. 1, 2, and 4.

Each of the upper sections A' of the side frames has formed in its inner face two guideways or grooves $b$, inclined to a perpendicular, to receive the arms E' of the mold carriage E, in such a manner that said carriage may be moved up and down therein, said carriage having set in each end thereof a stud $b'$ which projects outward through the slot $b^2$ cut through said frame, see Figs. 1 and 3, said stud having fitted thereon one end of a connecting-rod F or F' the opposite end of which is mounted on a crank-pin $a$ or $a'$ as shown in Figs. 1, 2, and 4.

A mold $E^2$ is secured upon the outer face of each of the carriages E so as to be movable up and down therewith, said mold being constructed substantially the same as described in my before cited prior patent, except that the outer face of the steel rim in this machine is straight or in a flat plane instead of curved to an arc concentric to the axis of the drum which carried it in said prior patent.

G, G, are cam bars each provided on its inner face with the cam groove G' and pivoted at its upper end to the inner face of a frame A' and adjustably secured at its lower end to said frame by the bolt $c$ which passes through the curved slot $c'$ in said bar and is screwed into said frame, the set screw $c^2$ being set in the outwardly projecting lip $c^3$ on said bar to facilitate a nice adjustment of said bar.

H is a plate provided with the outwardly projecting ribs H', one at each end, which also extend below the lower edge of said plate and are pivoted at $d$ to the lower ends of the arms E' of the carriage E, said ribs having secured to their outer edges near their upper ends the plate $H^2$, to which is secured the depressor plate $H^3$, and said ribs also have secured thereto the sheet metal plate $H^4$ which with the plate H and ribs H' forms a rectangular chute down which the cut blank falls to the packing table L. The plate H is also provided with the inwardly projecting ears $H^6$ in which is mounted the rod J which projects outward through said ears and has mounted on said projecting ends the anti-friction rolls $e$ $e$ which fit into and are acted upon by the path G' to vibrate the plate H and the depressor plate $H^3$ to clamp the piece of material in the mold $E^2$ preparatory to being skived to the desired shape, by the knife I' adjustably secured to the plate $I^2$ by the bolts $f'$ $f'$ when the mold $E^2$ and carriage E are moved downward.
The plate $I^2$ is bolted to the edges of the frames A' A' in a fixed position and the knife I' is so arranged relative to the mold $E^2$ and the depressor $H^3$ as to just clear their outer faces when they are moved downward past the cutting edge of said knife.

The ears $H^5$ of the plate H have adjustably secured thereto by the pivot pins $e'$ and clamping bolts $e^2$ the arms J' J' in which are mounted so as to extend from one arm to the other the two rods $e^3$ $e^3$ upon which are adjustably secured the push pins $e^4$ $e^4$ which pass through slots in the carriage E and holes in the mold $E^2$ and serve to push the blank out of the mold after it has been cut to the desired shape by the knife I' and the mold has moved upward again till the rolls $e$, $e$, have passed above the throws in the cam paths G' and moved the depressor plate $H^3$ outward when the stiffener blank will drop down the chute between the plates H and $H^4$ until arrested by the plate $g$, fitted to a bearing on the stand $g'$ secured to the inner face of the plate H at its lower edge, and movable thereon toward and from the center of the machine by the action thereon of the arms $g^2$ $g^2$ firmly secured on the rocker-shaft $g^3$ mounted in bearings in the ears $H^5$, and having secured thereon the elbow lever $g^4$ the long arm of which is connected by the spring $g^5$ to the inner end of the stand $g'$ while the short arm of said elbow lever strikes against the inner face of the plate H to limit the downward movement of the free end of the long arm of said lever as shown in Fig. 3.

The long arm of the lever $g^4$, as the carriage approaches the end of its downward movement, strikes the lug $h$ on the slotted tie girt K to move it and the arms $g^2$ $g^2$ about the axis of the rocker shaft $g^3$ and thus move the plate $g$ inward and permit the stiffener blank to drop upon the packing table L in front of the reciprocating packer L' to which an intermittent reciprocation is imparted by the action of the rolls $h'$ and $h^2$ carried by the arms $h^3$ and $h^4$ secured upon the shafts C' and $C^2$ respectively.

The frames A' A' are provided at their upper ends with the outwardly projecting lips $i$, $i$ extending horizontally across the widths of said frames to each of which is fitted a grooved bar M so as to be movable endwise thereon said bars M M being connected together by the tie bar M', so as to form a single carriage upon which is mounted so as to be movable therewith the knife carriage N, and the female notch-cutting die $j$. Each grooved bar M has formed in the middle of its lower edge a notch to receive the upper end of the three armed lever $M^2$ mounted upon a stud set in the frame A' as shown in Fig. 4. The lever $M^2$ has adjustably secured thereto by means of the clamping bolt $k$ and the set screws $k'$ $k'$, the bar $M^3$ against the lower surface of which the upper ends of the connecting rods F and F' alternately act to move the lever $M^2$ about is axis of motion in opposite directions and thus in a reciprocating motion to the knife carriage N.

The tie girt or plate B' has bolted to its upper surface two small side frames O O which with the cap plate O' and the inclined plate $O^2$ form an inclosing casing for the front portion of the knife carriage N. The front ends of the knife carriage and the side frames O O are inclined to the angle that it is desired to cut the strip of leather-board in dividing it into proper lengths for heel stiffeners and the knife carriage has secured to its front inclined end the two knives $l$, $l$, and the frames O, O, have secured upon their front inclined ends the knives or cutters $m$ $m$ in such a manner that they may be adjusted toward or from the knives $l$, $l$, as shown in Figs. 1. and 5.

The knife carriage or holder N is composed of a top plate $n$, four pendent inclined ribs $n'$ $n'$ and $n^2$ $n^2$, and the inclined front plate $n^3$ connecting the front ends of the ribs $n^2$ $n^2$, and the plate $n$ has secured therein the steel plate $n^4$ which fits into a groove in the cap plate $O'$ by which said knife carriage is guided in its lateral movements.

The tie girt or plate $B'$ is made up of a central plate and the two side bars $B^2$, $B^2$, so formed and connected as to form two longitudinal slots $B^3$, $B^3$, between said central portion and the bars $B^2$ through which the severed pieces of leather-board drop after being cut from the strip by the cutters $l$ $m$. Upon the inner wall of each of the slots $B^3$ is secured the male cutter $j'$ which co-operates with the female die or cutter $j$ to cut the notch in the center of the length of the flange forming edge of the stiffener blank. The tie plate $B'$ also has secured thereto and depending therefrom the fingers $j^2$ and $j^3$ which serve to guide the piece of material severed from the strip by the cutters $l$, $m$, as it falls through the slot $B^3$ on its way to the mold $E^2$. The bars $B^2$ $B^2$ each has secured thereto two stands $o'$ $o'$ in bearings in which is mounted the rocker shaft $o^2$ upon which are firmly secured the pendent arms $o^3$ $o^3$ to which are attached the inwardly projecting fingers $o^4$, $o^4$, which serve to arrest the fall of the piece of material at the proper point and hold it, when in the position shown at the left side of Fig. 3, and to release it again when moved into the position shown at the right of said figure.

The rocker shafts $o^2$ have secured upon one end thereof the arms $o^5$ $o^5$ the free ends of which are connected together by the spring $o^6$, and the opposite ends of said shafts have secured thereon the arms $o^7$ which project upward therefrom and carry at their free ends a truck $o^8$ $o^8$, with which the lips $p$ $p$, projecting inward from opposite ends of one of the bars M, engage to impart an oscillating motion to said shafts $o^2$ and in co-operation with the spring $o^6$ cause the fingers $o^4$, $o^4$, to alternately assume the different positions shown in Fig. 3.

Each of the carriages E has secured upon its outer face the two stands $q$, $q$, in bearing in which is mounted the rectangular rocker shaft P provided with a frictional collar $p'$ at one end and with an arm $p^2$ at its opposite end which when the carriage E is moved downward engages with the inwardly projecting lip $p^3$ of the stand $P'$ to move said shaft about its axis in one direction and when the carriage is moved upward comes in contact with the pin or lug $p^5$ to move said shaft in the opposite direction. The shaft P has formed therein two series of holes in one of each series of which is removably secured, so that it can be readily changed to either of the other holes of its series, the angularly bent finger $p^4$ which serves as a stop gage to arrest the downward movement of the piece of material when in proper position to be pressed into the mold by the compressor $H^3$.

Q Q are two levers pivoted at $r$ to each of the molds $E^2$ and connected together above said pivots by the spring $r'$ the tension of which tends to throw the lower ends of said levers outward, which lower ends are, at the proper time, thrown inward, or toward each other, against the tension of said spring, by the action of the cams on the inner faces of the stands $P'$ and $P^2$. upon the plungers $r^2$ $r^2$ mounted in the bearings $r^3$ $r^3$, secured upon said mold, with their inner ends in contact with the lower ends of said levers, as shown in Fig. 2.

The tie girt or plate $B'$ has cut through it the central transverse slot $s$ between the notch forming cutters $j$ $j$, one side of which is inclined and coincides with the inclined bottom of the chute R secured to the under side of said girt $B'$ as shown in Fig. 4, said chute serving to convey the pieces cut out in forming the notches in the center of the blank, to one side of the machine.

To each of the knife holding plates $I^2$ is secured a broad inclined chute $I^3$ to receive the waste material cut from the blanks by the knife $I'$ and convey the same to one side of the machine as shown in Figs. 1 and 2.

S is a gage provided with the two parallel rods $S'$ fitted to bearings in the stands $S^2$ $S^2$, secured to the upper surface of the tie plate $B'$ on opposite sides of the bar $M'$, and adjustable in said bearings to determine the length of blank to be cut from the strip of material shown in Figs. 8 and 9. The bar $M'$ has secured thereto or formed in one piece therewith the push bar $s'$ which is movable with said bar M and serves to discharge the severed piece of material after it is cut from the strip and the central notch has been cut therein.

The knife $I'$ is moved upward by the screws $I^4$ $I^4$, which are threaded in bearings in inwardly projecting ears on the plate $I^2$, whenever it is desired to adjust said knife on account of the wearing away of the same.

It should be understood that the machine illustrated in the drawings is a double machine, or in other words that the mechanism upon each side of a vertical line drawn through the centers of Figs. 1 and 3 are duplicates of each other.

In carrying out the objects of this invention as set forth herein, the operation of my invention is as follows: The several parts of the machine being in the positions shown in the drawings a strip of material formed as shown in Figs. 8 and 9 is inserted endwise into the inclined opening $t$ in the front side of the head of the machine, see Fig. 1, and between the male notch forming cutter $j'$ and the rib $n^2$ of the knife carriage N at the right of the central vertical line of Figs. 1 and 3 until its end is in contact with the gage S when as the shafts C' and C² and disks D' and D² are revolved in the directions indicated by the arrows on Fig. 1, and the upper end of the connecting-rod F' comes in contact with the depressed end of the bar M³, attached to and practically forming a part of the knife carriage operating lever M² moves said lever about its fulcrum and causes the knife carriage N to be moved toward the right of Fig. 1 and the right hand pair of cutters $l$ and $m$ to sever a piece of material from said strip by an oblique cut as indicated by the dotted line $u$ on Fig. 8. The operator then turns the strip of material over and inserts its end into the opening $t'$ at the left of the center of the head as shown in Fig. 1, as in the first case when the reversal of the motion of the knife carriage will cause a second piece of material to be severed from the strip by an oblique cut inclined in a direction opposite to that of the previous cut as indicated by the dotted line $v$ on Fig. 8. The movement of the knife carriage toward the right of Fig. 1 to sever the first blank causes the reversal of the positions of the fingers $o^4$, $o^4$, and said fingers at the right of Figs. 1 and 3 are thus moved into a position to arrest the blank as it falls through the slot B³. When the knife carriage is moved toward the left of Figs. 1 and 3 the positions of said fingers $o^4$ are again changed and the blank that is severed by said movement of the knife carriage is arrested in its fall by one pair of said fingers while the other pair of fingers is withdrawn from beneath the blank supported thereby, which blank then falls to a position in front of, or opposite to, the mold E², being guided in said downward movement by the guide fingers $j^2$ and $j^3$, and falling between said mold and the depressor plate H³, where its downward movement is arrested by the angular fingers $p^4$, said mold and its carriage being at that time at or near the extreme of its upward movement. As the carriage E and mold E² descend the action of the throws of the cam path G' upon the rolls $e\ e$ causes the depressor with its carrier to be moved inward and press the blank into the mold when a continuation of the downward movement of said carriage and mold past the edge of the stationary knife I' causes all the material which projects beyond the face of the steel rim of said mold to be cut away and fall upon the chute I³. During the latter part of the descent of the carriage E and mold E² the finger $p^4$ is withdrawn from beneath the blank by the action of the lip $p^3$ upon the arm $p^2$ and when said carriage and mold have been moved upward, till the trucks $e$ have passed the throw of the cam G', the depressor H³ and the push pins $e^4\ e^4$ have been moved outward, and the completed stiffener blank is discharged from the mold thereby and falls down the chute composed of the plates H H⁴ and ribs H' until it is arrested by the plate $g$, where it remains until the next descent of the carriage E, when the free end of the long arm of the elbow lever $g^4$ strikes the lug $h$, thereby causing the shaft $g^3$ to be moved about its axis, and by the consequent movement of the lower ends of the levers $g^2$ move the plate $g$ inward to uncover the lower end of said chute and allow the stiffener blank to drop upon the packing table in front of the packer L'. When a blank has fallen upon the stop fingers $p^4$ in front of the mold E² the first part of the downward movement of said mold causes the centering levers Q Q to be moved toward each other to correct any irregularity in the position of said blank before the depressor forces it into the mold. In the foregoing description of the operation, except so far as relates to the severing of the blank from the strip of material reference has only been made to the mechanism at one side of the machine but the mechanism upon the other side and the operation thereof is the same as above described except that the operations of one side are in advance of the other, due to the fact that the blanks are severed from the strip of material alternately at the right and left of the center of the machine.

What I claim as new, and desire to secure by Letters Patent of the United States, is—

1. In a machine for cutting heel stiffeners from a strip of material the combination of a reciprocating knife carriage; two cutters carried by said carriage with their cutting edges inclined to a perpendicular and facing outward from the center of said carriage; two fixed cutters constructed and arranged to co-operate with said movable cutters to alternately act upon said strip of material to sever a blank therefrom; a gage to determine the length of the blank to be cut; two pairs of notch forming cutters arranged to act in unison with the severing cutters; and mechanism having provision for reciprocating said knife carriage.

2. In a machine for cutting heel stiffener blanks the combination of a reciprocating knife carriage; two cutters carried by said carriage with their cutting edges inclined to a perpendicular and facing outward from the center of said carriage; two fixed cutters constructed and arranged to co-operate with said movable cutters to alternately act upon and sever a section from a strip of material presented thereto; a gage to determine the length of the blank to be severed; a pair of molds having formed in their outer faces recesses the outlines of which correspond to the desired outlines to be given to the blanks when completed; a pair of depressors for pressing the severed blanks into said molds, said molds and depressors being located one beneath each pair of severing cutters and constructed and arranged to be movable toward and from said severing cutters in right lines; a pair of fixed skiving cutters for trimming the surplus stock from the blanks after they are pressed into said molds; guideways between said severing cutters and molds down which the severed blanks may fall by the force of gravity;

and movable stops for arresting the descent of said blanks at the proper points.

3. In a machine for cutting heel stiffener blanks from a strip of material the combination of a laterally reciprocating knife carriage; a pair of cutters secured upon said carriage with their cutting edges facing in opposite directions; a pair of fixed cutters constructed and arranged to co-operate with said movable cutters to alternately act upon, and sever a blank from said strip; a gage to determine the length of the blanks to be cut; guideways down which said blank may fall by the force of gravity; movable stops for arresting the fall of said blanks; a pair of molds to receive said blanks; two pairs of centering levers Q Q; two pairs of cams, and two pairs of plungers for operating said levers to centrally locate said blanks relative to said molds; a pair of depressors for clamping said blanks within said molds; a pair of fixed skiving knives; mechanism for imparting a lateral reciprocation to said knife carriage; and mechanism having provision for moving said two molds alternately in opposite directions substantially as described.

4. In a machine for cutting heel stiffener blanks, the combination of a laterally reciprocating knife carriage; a pair of cutters secured thereon with their cutting edges facing in opposite directions; a pair of fixed cutters constructed and arranged to co-operate with said movable cutters to alternately act upon a strip of material and sever a blank therefrom; a gage to determine the length of the blanks to be cut from said strip; a pair of molds located one below each pair of severing cutters; a pair of depressors constructed and arranged to press the severed blanks into said molds; a guideway down which the blank severed by each pair of cutters may fall by the force of gravity to a position opposite said molds; stops for arresting said blanks in their descent; means having provision for centering said blank longitudinally; cams for operating the depressor to clamp the blank in the mold; a pair of fixed skiving cutters; mechanism for reciprocating said molds and depressors in right lines toward and from the severing and skiving cutters, and mechanism having provision for discharging the skived blank from the mold.

5. The combination of the shafts C, C', C$^2$; the gears C$^3$, C$^4$, C$^5$; the two pairs of cranks D' and D$^2$; the crank pins $a$ and $a'$ the mold carriages E; the molds E$^2$; the rods F F' connecting said cranks and mold carriages; the bars M, M, M'; the knife carriage N carried by said bars; the three armed levers M$^2$ M$^2$ engaging the bars M M and constructed and arranged to be vibrated about their fulcrums by the alternate contact therewith of the upper ends of said rods F and F'.

6. The combination of the reciprocating mold carriage E, provided with the arms E'; the mold E$^2$ secured to and movable with said carriage; the plate H provided with the ribs H' and ears H$^5$, and pivoted to the arms E'; the depression plate H$^3$ secured to the ribs H'; the cam bars G provided with the cam paths G'; the trucks $e$, $e$, carried by the ears H$^5$ in positions to engage with and be acted upon by said cam paths; the arms J' adjustably secured upon the ears H$^5$ the rods $e'$ $e'$ carried by said arms and the push pins $e^4$ all constructed, arranged and operating substantially as and for the purposes described.

7. The combination of a pair of cutters constructed and arranged to sever a piece of material from a strip resting upon its edge; a gage for determining the length of piece to be severed; means having provision for reciprocating one of said cutters; guide ways down which said severed piece may fall by the force of gravity; a mold to receive said piece of material constructed and arranged to be reciprocated toward and from said severing cutters in a straight line; a depressor for clamping said piece of material in said mold; a fixed skiving knife, means having provision for reciprocating said mold and depression; mechanism having provision for vibrating said depressor to alternately clamp and release said piece of material; the stops $o^4$ $p^4$ and $g$; and mechanism for intermittently advancing and retracting said stops.

8. In a machine for cutting heel stiffener blanks from strips of material, the combination of two pairs of severing cutters constructed and arranged to act alternately upon said strip to sever sections therefrom; two reciprocating molds each provided with a vibrating depressor to clamp the blank in said mold, and constructed and arranged to be alternately moved toward their co-operating severing cutters; a pair of fixed skiving cutters; and guide-ways down which said severed sections of material may descend, by the force of gravity, to a position in front of said molds.

In testimony whereof I have signed my name to this specification, in the presence of two subscribing witnesses, on this 2d day of May, A. D. 1893.

GEORGE F. MOORE.

Witnesses:
N. C. LOMBARD,
WALTER E. LOMBARD.